May 16, 1967

R. L. WATTERS 3,320,532

LOGARITHMIC MICRO-MICROAMMETER HAVING
FIELD EFFECT TRANSISTOR IN
FEEDBACK PATH

Filed July 23, 1963

Inventor:
Robert L. Watters,
by Richard R. Brainard
His Attorney.

United States Patent Office 3,320,532
Patented May 16, 1967

3,320,532
LOGARITHMIC MICRO-MICROAMMETER HAVING FIELD EFFECT TRANSISTOR IN FEEDBACK PATH
Robert L. Watters, Schenectady, N.Y., assignor to General Electric Company, a corporation of New York
Filed July 23, 1963, Ser. No. 297,027
5 Claims. (Cl. 324—123)

This invention relates to electrical current measuring devices and more particularly concerns such a device capable of measuring extremely small magnitudes of current over a wide, continuous range.

It is frequently highly desirable to provide a current measuring device capable of measuring extremely small magnitudes of current over a wide, continuous range. For example, such a device can be used frequently to great advantage as the indicator in mass spectrographs, particularly when electron multiplier tubes also are utilized as is generally the case, and in ion gauges.

Mass spectrographs and ion gauges normally present high output impedances at low levels of current in the range from $10^{-12}$ amperes to $10^{-5}$ amperes. In the past, relatively complex electrometer devices have been employed to provide an indication of the magnitude of these small currents. Electrometers suitable for the purpose have in the past been costly as a result of the relatively complicated circuits involved. There is a need for an economical micro-microammeter (capable of measuring current magnitudes as low as $10^{-12}$ amperes) for use with mass spectrographs and ion gauges because they are receiving increased popularity for leak detection and other indicating services in a wide variety of commercial endeavors.

Oftentimes, sources of extremely low magnitude current are subject to large changes in output current magnitude. Frequently the changes in current magnitude span a few decades (factors of 10). Changes in either direction of large magnitude usually necessitate a change of scale prior to obtaining a useful indication. It is desirable to provide a micro-microammeter having a logarithmic response. With an instrument having a logarithmic response wide ranges of current values can be accommodated and indicated without necessitating scale changes or other switching.

In some circuit applications it is desirable to have a micro-microammeter which can indicate current flow in either direction. An example of such an application is as the sensing device in a Wheatstone Bridge. While it is possible to provide a switch to reverse leads to the source of current to be measured in a few applications, normally in circuits where extremely small currents are significant the ground connection must be preserved. Therefore, it is desirable that the micro-microammeter be capable of measuring current flow in either direction. There are, at present, no known logarithmic micro-microammeters capable of measuring current flow in either direction.

Accordingly, it is a primary object of this invention to provide an economical micro-microammeter having a logarithmic response.

It is another object of this invention to provide a micro-microammeter having a logarithmic response and capable of indicating the magnitude of current flowing in either direction.

Briefly, I have discovered that certain field effect transistors provide junctions, which, in the forward biased direction, change in resistance logarithmically at low levels of current down to $10^{-12}$ amperes and that such devices present a very high junction resistance, in the order of $10^{10}$ ohms near the zero voltage crossing on their current-voltage characteristic curves. In accordance with my invention I provide a logarithmic micro-microammeter by connecting at least one junction of such a field effect transistor in series in the negative feedback circuit of a substantially linear amplifier. The junction is connected in such a manner as to be forward biased. The current through a low impedance connected to the output of the amplifier is used as an indication of input current. Additionally, I have discovered that a second similar semiconductive junction device may be connected in parallel with the first junction, but oppositely poled thereto, to provide a logarithmic micro-microammeter adapted to measure input current flowing in either direction.

The novel features that are characteristic of this invention are set forth with particularity in the appended claims. The invention itself both as to its organization and method of operation, as well as additional objects and advantages thereof will be understood best from the following description when read in connection with the accompanying drawing wherein:

Figure 1:
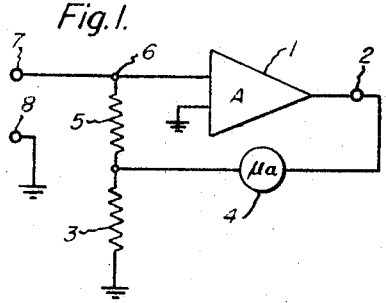
FIGURE 1 is a schematic diagram of a known electrometer circuit.

By way of more quickly understanding the present invention it is helpful to consider a conventional electrometer circuit such as shown in FIGURE 1. The electrometer includes a substantially linear direct current amplifier 1 having an output terminal 2 which is connected to an impedance means, resistor 3, through a current indicator 4. A feedback resistor 5 is similarly connected through indicator 4 from amplifier output terminal 2 to amplifier input terminal 6. Electrometer input terminals 7 and 8 are arranged to be connected to a source of current to be measured.

It is desired that the feedback path including resistor 5 introduce negative feedback from amplifier output terminal 2 to amplifier input terminal 6. To this end, amplifier 1 is selected to provide a complete phase reversal between its input and output, all as is well-known in the art.

Amplifier 1 of FIGURE 1 is selected to provide a high gain, preferably in excess of 100, so that the ratio of current through current indicator 4 to the current at input terminals 7 and 8 is substantially independent of the gain of amplifier 1 and depends upon the resistance value of resistor 5 and the resistance value of resistor 3. By selecting resistor 5 to be many orders of magnitude greater in resistance value than resistor 3, the current flowing through indicator 4 is made many orders and magnitude greater than the current at terminals 7 and 8 and equal to the input current multiplied by the resistance ratio between resistor 5 and resistor 3. Frequently, a plurality of input current ranges are provided by having a plurality of resistors of differing resistance values and a suitable high impedance switch having good isolation to selectively insert a resistor of a particular desired value corresponding to a desired range. In this way, a ratio between the input current at terminals 7 and 8 and the current through indicator 4 may be varied to provide a large number of ranges with a single amplifier 1 and indicator 4.

In accordance with the present invention a micro-microammeter is provided which is capable of continuously indicating current magnitude over a range exceeding 6 decades, from $10^{-12}$ amperes to $10^{-5}$ amperes. This is accomplished economically by providing a semiconductive junction device having zero voltage impedance in excess of $10^{10}$ ohms in the place of resistor 5 of FIGURE 1. By zero voltage impedance it is intended to designate the slope of the current-voltage characteristic curve for the device at the zero voltage axis crossing.

An example of a semiconductive junction device suitable for use with my invention is the commercially available field effect transistor of the type described in the "Proceedings of the I.R.E.", vol. 40, November 1952, at at pages 1365–1376 by W. Shockley and in the "Handbook of Semiconductor Electronics," published by McGraw-Hill and edited by L. P. Hunter, at page 7. I have discovered that such devices provide a resistance which decreases logarithmically as current in the forward bias direction therethrough is increased in the extremely low current region from $10^{-12}$ amperes to $10^{-5}$ amperes. As mentioned in connection with FIGURE 1, the current through indicator 4 is related to the input current by a ratio equal to the ratio of resistance values between resistor 5 and resistor 3. Since resistor 3 is normally of fixed value, substitution of a logarithmic element for resistor 5 provides a micro-microammeter wherein the ratio between input current and indicated current decreases logarithmically as the input current is increased. This enables continuous indication, without scale changes or other switching, of current continuously over a range exceeding 6 decades.

Figure 2:
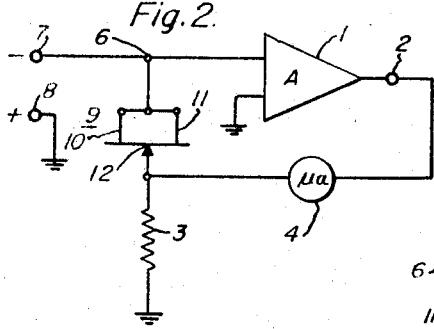
FIGURE 2 is a schematic diagram of a logarithmic micro-microammeter constructed in accordance with the present invention.

FIGURE 2 illustrates a micro-microammeter in accordance with my invention having a field effect transistor 9 connected in the place of resistor 5 of FIGURE 1. Field effect transistor 9 includes source electrode 10 and drain electrode 11 which are connected together and to amplifier input terminal 6. Gate electrode 12 is connected to amplifier output terminal 2 through indicator 4. The junctions of field effect transistor 9 are forward biased in the circuit of FIGURE 2 by connecting input terminal 7 to the negative terminal of a source of current to be measured, as indicated in the illustration. By reversing the connections to transistor 9, terminal 7 can be connected to the positive terminal of a source.

While I have shown in the circuit of FIGURE 2 that both the source electrode 10 and drain electrode 11 are connected to amplifier input terminal 6, I have discovered that circuit performance is not impaired by leaving one or the other of the electrodes unconnected. I have found commercially available transistors of the types 18A1–18A5 each suitable for use in my invention. It is only essential that one of the junctions in these semiconductive junction devices be utilized because the junction resistances are very large compared to the bulk resistance of the device at low current.

Figure 3:
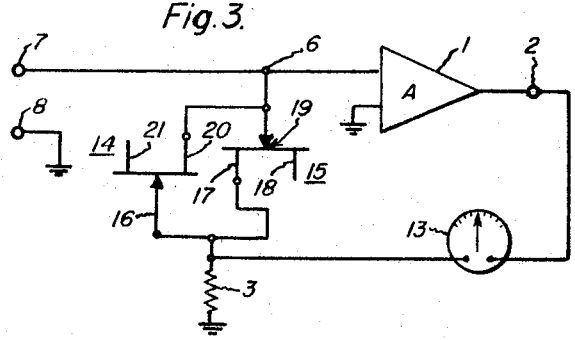
FIG. 3 is a schematic diagram of a micro-microammeter constructed in accordance with another embodiment of the present invention.

FIGURE 3 shows a logarithmic micro-microammeter which is arranged to accommodate input current flowing in either direction without requiring any switching or other circuit alteration. In the embodiment of FIGURE 3 the current indicating instrument 4 of FIGURES 1 and 2 is replaced by current indicator 13 which indicates zero current on the center of its scale. Current indication is provided by excursions from the centered position to the left or right depending upon the direction of current flow through indicator 13.

The circuit of FIGURE 3 employs two parallel-connected oppositely-poled semiconductive junction devices 14 and 15 which may take the form of field effect transistors as shown. Gate electrode 16 of transistor 14 and one of the source and drain electrodes 17 and 18 of transistor 15 are connected together and to amplifier output terminal 2 through current indicator 13 and to the the ungrounded terminal of resistor 3. Gate electrode 19 of transistor 15 and one of the source and drain electrodes 20 and 21 of transistor 14 are connected together and to amplifier input terminal 6. In this circuit connection one of the junctions from each of transistors 14 and 15 are connected in parallel, but oppositely poled. When one junction is forward biased the other junctions is reverse biased.

I have found with the circuit of FIGURE 3 that the back-resistance, or resistance in the reverse current direction, is sufficiently high so that the device which is reverse-biased is effectively removed from participation in circuit operation. Therefore, the operation of the circuit of FIGURE 3 is substantially the same as that of FIGURE 2, however, the arrangement of FIGURE 3 yields a logarithmic micro-microammeter arranged to receive input current flowing in either direction.

Figure 4:
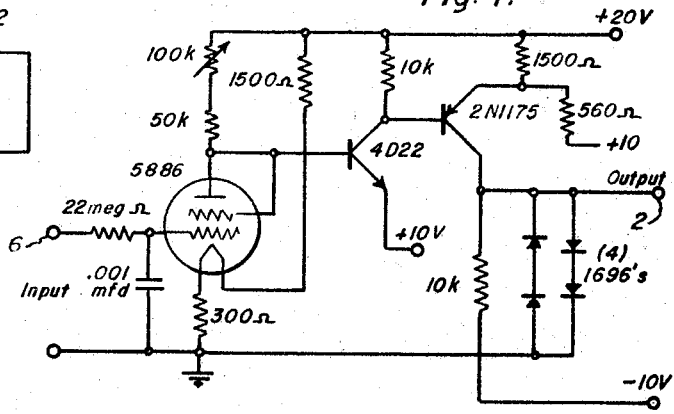
FIGURE 4 is a schematic diagram, with components labeled, of an amplifier suitable for use with the present invention; and, FIGURE 5 is a graph showing the response of a logarithmic micro-microammeter constructed in accordance with the present invention.

FIGURE 4 illustrates a schematic circuit diagram, with components labeled, of a direct current amplifier which I have found to be particularly suitable for use as amplifier 1 in the embodiments of my invention shown in FIGURES 2 and 3. The amplifier circuit of FIGURE 4 is illustrated merely to aid those skilled in the art in practising my invention, and it is to be understood that the present invention is not intended to be limited to any particular type of amplifier.

The first stage of the amplifier circuit of FIGURE 4 employs a type 5886 tube. This is a specially designed low voltage, high input impedance, vacuum tube which is commercially available and most frequently found in the input stage of electrometers. Of course, other amplifying input means of comparably high input impedance could be used alternatively. The first amplifying stage is followed by two direct-coupled stages each using a transistor as the active element. As illustrated, the transistors are of opposite conductivity types. I prefer to use a plurality of silicon diodes, which may be type 1N1696's, connected as shown in the amplifier output for the purpose of providing protection for the indicating instrument of the micro-microammeter. None of the diodes conduct appreciably during normal circuit operation.

Figure 5:
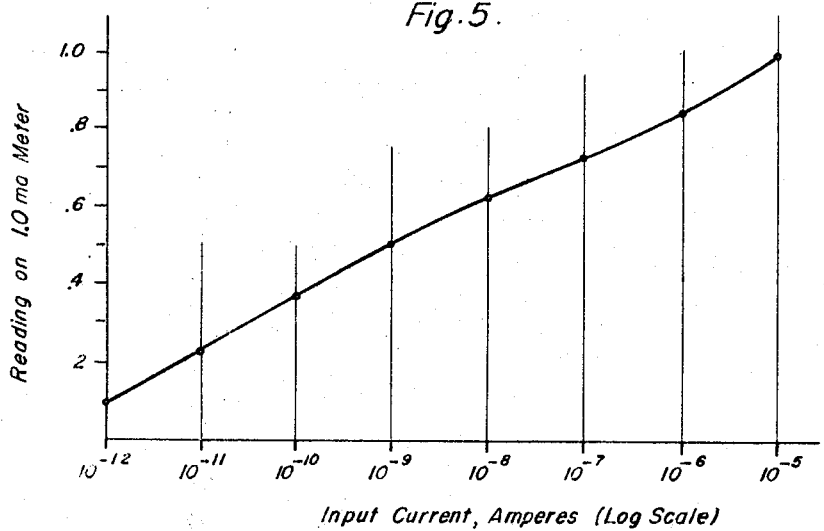

FIGURE 5 illustrates an actual performance curve of the micro-microammeter of my invention using the amplifier of FIGURE 4 as amplifier 1 in the embodiment of my invention shown in FIGURE 2. A 1 milliampere meter was used as indicator 4, the field effect transistor 9 was a type 18A5 and resistor 3 had a resistance value of about 530 ohms. The resistance of resistor 3 was selected to provide a full scale indication at $10^{-5}$ amperes input current. The graph of FIGURE 5 is a plot of the meter indication as a function of the log of input current in amperes. It will be noted that the indication is substantially logarithmic for over 6 decades from $10^{-12}$ amperes to $10^{-5}$ amperes.

While I have shown and described my invention in conjunction with certain specific embodiments thereof, it will be appreciated that embodiments of my invention may take many different forms other than those shown in the drawing. For example, the current indicating instrument of my invention could equally well be disposed to measure only the current flowing in the load resistance 3, or the voltage across the load resistor could be sensed and used as an indication of the magnitude of input current. Indeed, both the current indicating instrument and load resistance could be obviated by a suitable low resistance voltmeter connected to substitute for the load resistance. Thus the drawing should be understood as exemplary of the appearance of but two specific embodiments of my invention. Therefore, it is intended by the appended claims to include such variations and modifications of my invention as the above and others falling within the true spirit and scope of my invention.

What I claim as new and desire to secure by Letters Patent of the United States is:

1. A logarithmic micro-microammeter comprising: a substantially linear amplifier having input means and output means; a negative feedback circuit including a field effect transistor having two semiconductive junctions connected from said output means to said input means, said junctions being connected to be forward biased; an impedance means connected to said transistor, said impedance means having an impedance value many orders of magnitude less than the input impedance of said linear amplifier; means adapted to connect a source of current to be measured to said input means; and, means coupled to said impedance means for indicating the current in said impedance means.

2. A logarithmic micro-microammeter comprising: a substantially linear direct coupled amplifier having input means and output means; means arranged to connect a source of current of either polarity to be measured to said input means; a resistive load for said amplifier connected to said output means; a negative feedback circuit connected from said output means to said input means, said circuit including at least two parallel-connected oppositely poled field effect transistor junctions; and, means coupled to said load to provide continuously an indication of the magnitude of the current from said source over a range thereof exceeding six decades.

3. A logarithmic micro-microammeter comprising: a substantially linear amplifier having input means and output means; a negative feedback circuit including a field effect transistor having at least one semiconductive junction connected in series circuit from said output means to said input means, said field effect transistor being connected to forward bias said junction; load impedance means connected to said field effect transistor, said load impedance means having an impedance less than the input impedance of said linear amplifier; means adapted to connect a source of current to be measured to said input means; and means coupled to said load impedance means for indicating the magnitude of current flowing through said load impedance means.

4. A logarithmic micro-microammeter comprising: a substantially linear direct coupled amplifier having input means and output means; a negative feedback circuit including a field effect transistor having at least one semiconductor junction, and current indicating means connected in series circuit with said junction from said output means to said input means, said field effect transistor being connected to forward bias said junction; a a load resistor connected to said negative feedback circuit at a point intermediate said field effect transistor and said current indicating means, said load resistor having an impedance many orders of magnitude less than the input impedance of said linear amplifier and the impedance of said junction in normal operation; and means adapted to connect a source of current to be measured to said input means.

5. A logarithmic micro-microammeter comprising: a substantially linear direct coupled amplifier having input means and output means; means adapted to connect a source of current to be measured to said input means; a negative feedback circuit connected from said output means to said input means, said circuit including current indicating means providing a continuous indication of the magnitude of current from said source over a range thereof exceeding six decades and two parallel connected opposite-poled semiconductive junctions of a pair of field effect transistors respectively, each of said junctions having a zero voltage impedance in excess of $10^{10}$ ohms; and load impedance means for said amplifier connected to said semiconductive junctions.

References Cited by the Examiner

UNITED STATES PATENTS

| | | | |
|---|---|---|---|
| 2,861,182 | 11/1958 | Green | 328—145 |
| 2,988,699 | 6/1961 | Gardner | 324—123 X |
| 3,094,670 | 11/1963 | Batchelor | 324—123 X |
| 3,111,627 | 11/1963 | Praglin | 328—145 |
| 3,237,028 | 2/1966 | Gibbons | 328—145 X |

WALTER L. CARLSON, *Primary Examiner.*

J. J. MULROONEY, *Assistant Examiner.*